United States Patent [19]

Otsuki et al.

[11] Patent Number: 4,579,886

[45] Date of Patent: Apr. 1, 1986

[54] CATHODE-DEPOSITING ELECTRODEPOSITION COATING COMPOSITION

[75] Inventors: Yutaka Otsuki; Hiroyoshi Omika; Akio Oshima, all of Yokohama; Yoshihiko Araki, Tokyo; Yasuyuki Tsuchiya, Hirakata, all of Japan

[73] Assignees: Nippon Oil Company, Ltd., Tokyo; Nippon Paint Co., Ltd., Osaka, both of Japan

[21] Appl. No.: 719,658

[22] Filed: Apr. 3, 1985

[30] Foreign Application Priority Data

Apr. 28, 1984 [JP] Japan .................................. 59-85102

[51] Int. Cl.$^4$ .......................... C08K 3/20; C08L 63/08
[52] U.S. Cl. .................................. 523/404; 204/181.7;
523/403; 523/413; 523/415; 524/413; 524/901
[58] Field of Search ....................... 523/404, 415, 403;
524/901, 413; 204/181 C; 528/103; 525/528, 531

[56] References Cited

U.S. PATENT DOCUMENTS

| | | | |
|---|---|---|---|
| 4,139,396 | 2/1979 | Otsuki et al. | 524/901 |
| 4,251,414 | 2/1981 | Nakada et al. | 524/901 |
| 4,283,313 | 8/1981 | Omika et al. | 523/400 |
| 4,370,453 | 1/1983 | Omika et al. | 528/327 X |
| 4,433,078 | 2/1984 | Kersten et al. | 524/901 |

*Primary Examiner*—Theodore E. Pertilla
*Attorney, Agent, or Firm*—Millen & White

[57] ABSTRACT

A cathode-depositing electrodeposition coating composition comprising an aqueous solution or dispersion containing (A) a reaction product of (1) epoxidized diene polymer, (2) an amine and optionally, (3) polymerizable unsaturated aliphatic acid;
(B) a reaction product of bisphenol epoxy resin and a polymerizable aliphatic acid;
(C) a blocked polyisocyanate compound; and
(D) manganese dioxide or an organic salt of manganese, cobalt or copper.

The composition gives a coating film having excellent properties when electrodepositing and baking at a relatively low baking temperature.

12 Claims, No Drawings

CATHODE-DEPOSITING ELECTRODEPOSITION COATING COMPOSITION

BACKGROUND OF THE INVENTION

This invention relates to an electrodeposition coating composition of cathode-depositing type.

Certain types of resins having basic groups are dissociated into positively charged resin particles in an aqueous solution or dispersion thereof. When electrodepositing the solution or dispersion, these resins are deposited on the cathode. Cathode-depositing electrodeposition coating compositions have an important advantage over anode-depositing coating compositions containing a neutralizate of acid group-bearing resins in that the former eliminates the defects of the latter, i.e., dissolution of metallic substrates into the coating bath and other problems associated therewith.

It is known that a cathode-depositing electrodeposition coating composition may be prepared by introducing amino groups into carbon-to-carbon double bond-containing synthetic polymers such as liquid polybutadiene polymers and then neutralizing with an acid. See, Japanese Laid Open Patent Application Nos. 51-119727, 52-147638 and 53-16048.

This composition produces a cured film having excellent properties mainly through oxidative polymerization of unsaturated bonds possessed by the resin. This composition, however, requires relatively high baking temperatures when the coating film thereof is cured within a practical length of time. Low baking temperatures may be achieved by adding a drier compound such as water-soluble manganese salts. See, Japanese Laid Open Patent Application No. 53-142444. In this case, relatively large amounts of drier compound must be added. As a result, electrodeposition characteristics of the coating composition, such as capability of forming smooth and uniform films on the substrate are often impaired.

Low baking temperatures may also be achieved by introducing acrylic or methacrylic double bonds into the resin. See, Japanese Laid Open Patent Application No. 56-151777. In this case, a cathode-depositing electrodeposition coating composition which forms a cured film having excellent properties at a baking temperature as low as 160° C. may be obtained by incorporating an amount of water-soluble manganese salts.

Despite these and other attempts, the prior art electrodeposition coating compositions of the above type still have various problems. Since the oxidative polymerization reaction of unsaturated film-forming polymers takes place first from the surface of the resulting film, wrinkles are often formed or the interior of the film is not fully cured.

It is a principal object of the present invention to provide a cathode-depositing electrodeposition coating composition which eliminates shortcomings of the prior art compositions.

SUMMARY OF THE INVENTION

According to the present invention, there is provided a cathode-depositing electrodeposition coating composition which comprises an aqueous solution or dispersion containing:

(A) 100 parts by weight of a reaction product of:
(1) a polymer having a molecular weight from 500 to 5,000, a carbon-to-carbon double bond content corresponding to an iodine number from 50 to 500 and an oxirane oxygen content from 3 to 12% by weight,
(2) 30 to 300 millimoles per 100 g of said reactant (1) of an amine of the formula:

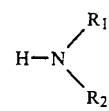

wherein $R_1$ and $R_2$ each represents a $C_1$–$C_{20}$ hydrocarbon radical, one of which being optionally substituted by a hydroxyl group, or $R_1$ and $R_2$ represent, taken together with the nitrogen atom, a ring system optionally having an unsaturation, and (3) 0 to 200 millimoles/100 g of said reactant (1) of an α,β-unsaturated carboxylic acid of the formula:

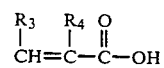

wherein $R_3$ and $R_4$ each represents a hydrogen atom or methyl group, an unsaturated aliphatic acid having a molecular weight from 100 to 350 and a conjugated carbon-to-carbon double bond content of at least 10% by weight, or a mixture thereof;

(B) 10 to 100 parts by weight of a reaction product of:
(1) a diglycidyl compound of the formula:

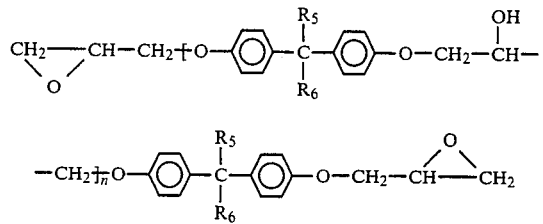

wherein $R_5$ and $R_6$ each represents a hydrogen atom or methyl group, and n is zero or an integer from 1 to 20, preferably from 1 to 10; and (2) 1.9 to 2.1 moles/mole of said glycidyl compound (1) of an α,β-unsatuated carboxylic acid of the formula:

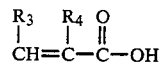

wherein $R_3$ and $R_4$ are as defined above, an unsaturated aliphatic acid having a molecular weight from 100 to 350 and a conjugated carbon-to-carbon double bond content of at least 10% by weight, or a mixture thereof;

(C) 2 to 20 parts by weight of a blocked polyisocyanate compound capable of regenerating isocyanate function upon heating; and (D) 0.005 to 1.0 parts by weight calculated as elementary metal of manganese dioxide or an organic salt of manganese, cobalt or copper.

By incorporating component (C), i.e. the blocked polyisocyanate compound, the coating composition of the invention overcomes various problems associated with prior art coating compositions.

DETAILED DISCUSSION

Component (A)

The starting unsaturated polymer having a molecular weight from 500 to 5,000 and an iodine number from 50 to 500 used for the preparation of reactant (1) of component (A) may be prepared by any known method. Typically, the polymer is prepared using the anion polymerization technique by polymerizing a $C_4$–$C_{10}$ conjugated diolefin, a mixture of such diolefins or a mixture of said diolefin with less than 50 mole % of an aromatic vinyl monomer such as styrene, α-methyl-styrene, vinyltoluene or divinylbenzene at a temperature from 0° C. to 100° C. in the presence of a catalyst such as an alkali metal or an organic alkali metal compound. Relatively low molecular-weight polymers having a pale color and a minimum gel content are preferable. Preferable polymerization methods include one using an organic alkali metal catalyst such as benzyl sodium and an alkyl arene chain transfer agent such as toluene as disclosed in U.S. Pat. No. 3,789,090, the living polymerization method using an alkali metal catalyst such as sodium and a polycyclic aromatic activating agent such as naphthalene in tetrahydrofuran as disclosed in Japanese Patent Publication Nos. 42-17485 and 43-27432, and one using a dispersion of alkali metal as catalyst and an ether such as dioxane as molecular weight regulating agent as disclosed in Japanese Patent Publication Nos. 32-7446, 38-1245 and 34-10188. Also included in examples of preferred polymerization methods is the coordinated anion polymerization method using acetylacetone complex of an element of group VII of the periodical table such as cobalt or nickel, or an alkylalminum halide complex as disclosed in Japanese Patent Publication Nos. 45-507 and 46-80300.

The starting polymer is epoxidized to reactant (1) having an oxirane oxygen content from 3 to 12% by weight by the known method using peroxy compounds such as hydrogen peroxide or peroxy acids.

Reactant (1) is reacted with reactant (2) and optionally further with reactant (3) to give component (A). Reactant (2) is an amine of the formula:

$$H-N\begin{matrix}R_1\\R_2\end{matrix}$$

wherein $R_1$ and $R_2$ are as defined above. Examples thereof include aliphatic amines such as dimethylamine or diethylamine, alkanol amines such methyl ethanolamine or diethanolamine, and heterocyclic amines such as morpholine or piperidine. The reaction may be carried out at a temperature from 50° C. to 200° C. in the presence or absence of a diluent. The amount of reactant (2) ranges from 30 to 300 millimoles, preferably from 50 to 200 millimoles per 100 g of reactant (1).

Reactant (3) is an α,β-unsaturated carboxylic acid of the formula:

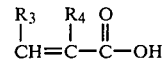

wherein $R_3$ and $R_4$ are as defined above, an unsaturated aliphatic acid having a molecular weight from 100 to 350 and a conjugated carbon-to-carbon double bond content of at least 10% by weight, or a mixture thereof.

Examples of α,β-unsaturated carbonxylic acids include acrylic or methacrylic acid. Examples of unsaturated aliphatic acids include sorbic acid, Chinese tung oil fatty acid, sunflower oil fatty acid, dehydrated castor oil fatty acid and the like. Isomerized soybean or linseed oil fatty acid, purified oleostearic acid, purified conjugated linoleic acid, and mixtures of unsaturated aliphatic acids having a total conjugated carbon-to-carbon content of at least 10% by weight may also be used. Dehydrated castor oil fatty acid is most preferable because it is commercially available in a large quantity. The reaction may be carried out at a temperature from 100° C. to 200° C. The amount of reactant (3) ranges from less than 200 millimoles, preferably from 50 to 150 millimoles per 100 g of said reactant (1).

Component (B)

Component (B) may be prepared by reacting a diglycidyl compound of the formula:

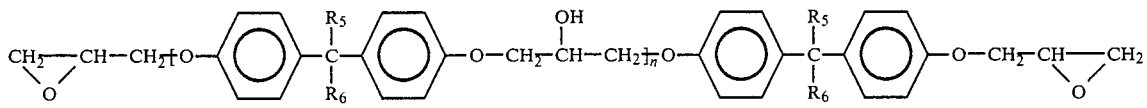

wherein all symbols are as defined above, with 1.9 to 2.1 moles per mole of the diglycidyl compound of α,β-unsaturated carboxylic acid, unsaturated aliphatic acid or their mixture specified as reactant (3) of component (A).

The diglycidyl compound is well-known in the art and is conventionally prepared by reacting bisphenol with eipchlorhydrin in the presence of an alkali. Examples of starting bisphenols include 2,2-bis(4'-hydroxyphenyl)propane, and 1,1-bis(4'-hydroxyphenyl)ethane, and bis(4'-hydroxyphenyl)methane. The reaction product may be further reacted with bisphenol and then epichlorhydrine to obtain higher molecular weight diglycidyl compounds.

The reaction of diglycidyl compound with α,β-unsaturated carboxylic acid, unsaturated aliphatic acid or their mixture may be carried out at a temperature from 0° C. to 200° C., preferably from 50° C. to 150° C. preferably in the presence of 0.01 to 1.0% of a radical polymerization inhibitor such as hydroquinon, methoquinone or N-phenyl-N'-isopropyl-p-phenylenediamine and a catalyst such as tertiary amines or quaternary ammonium salts. The reaction may be carried out in the presence or absence of a solvent. However, it is practically advantageous to use an amount of inert solvents such as ethylcellosolve acetate or methyl isobutyl ketone. After the reaction, the solvent need not be removed and component (B) containing the solvent may be admixed with other components to give final electrodeposition coating compositions.

Care should be taken in this reaction that substantially all epoxide groups have been reacted with carboxyl groups of

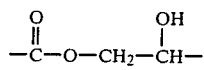

and no epoxide group remains unreacted. The presence of a large number of unreacted epoxide groups will cause gellation or otherwise undesirable problems when component (B) is admixed with component (A) in the final formulation. For example, the unreacted epoxide group reacts with a basic group present in component (A) to produce a reaction product which is relatively insoluble in water or unstable in an aqueous system upon storage. Thus the desired electrodeposition characteristics of the resulting coating composition may be greatly impaired.

Component (B) is incorporated for the purpose of improving anticorrosive properties of the resulting coating film. The amount of component (B) in the final composition ranges between 10 and 100 parts by weight, preferably between 30 and 100 parts by weight per 100 parts by weight of component (A). Excessive use may decrease solubility or dispersibility of the entire components in water.

Component (C)

Component (C) is prepared by reacting a free polyisocyanate compound with an isocyanato-group blocking agent at a temperature from 30° C. to 80° C.

Examples of free polyisocyanate compounds include aliphatic or alicyclic polyisocyanates such as 2,2,6-trimethylhexamethylenediisocyanate, dimer acid diisocyanate, isophoronediisocyanate, methylcyclohexane-2,4-diisocyanate and 4,4'-dicyclohexylmethanediisocyanate; and aromatic polyisocyanates such as 2,4-tolylenediisocyanate, 2,6-tolylenediisocyanate, 4,4'-diphenylmethanediisocyanate, m-phenylenediisocyanate and 1,5-naphthalenediisocyanate.

Examples of blocking agents include alcohols and alcohol ethers of 1 to 20 carbon atoms such as methanol, ethanol, propanol, butanol, amyl alcohol, hexanol, cyclohexanol, lauryl alcohol, ethylcellosolve, butylcellosolve and hexylcellosolve; oximes such as methyl ethyl ketoxime, acetoxime and cyclohexanone oxime; phenol and ε-caprolactam. Other blocking agents are well-known in the art.

By incorporating component (C), surface smoothness, anticorrosive and low-temperature baking characteristics of the resulting electrodeposition coating composition may be greatly improved. Component (C) is incorporated into the final composition in an amount from 2 to 20 parts, preferably from 5 to 10 parts by weight per 100 parts by weight of component (A). When the amount is too small, the improvement of film characteristics is not significant. Conversely, excessive amounts may retard the oxydative polymerization of component (A) and also increase weight loss upon baking.

Component (D)

Manganese dioxide and various organic acid salts of manganese, cobalt or copper may be incorporated to the coating composition of this invention. Examples of organic acid salts include water-soluble salts such as formate, acetate and lactate; and oil-soluble salts such as naphthenate and octoate. A preferred oil-soluble salt is manganese salt of a 1,2-dicarboxylic acid monoester of the formula:

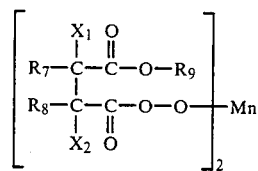

wherein $R_7$ and $R_8$ each represents a hydrogen atom or $C_1$–$C_{20}$ alkyl group, or $R_7$ and $R_8$ represent, taken together with the adjacent carbon atoms, a saturated or unsaturated six-membered monocyclic heterocycle or fused heterocycle of five-membered and six-membered rings; $R_9$ represents a hydrocarbon group of 1 to 20 carbon atoms which may be interrupted by an ether linkage or ester linkage; and $X_1$ and $X_2$ each represents an organic group of 1 to 10 carbon atoms or collectively they representative a double bond between the carbon atoms to which they are attached.

Component (D) is used in an amount from 0.005 to 1.0 parts, preferably 0.01 to 0.5 parts by weight per 100 parts of component (A) as elementary metal. Too small amounts are not effective, whereas excessive amounts decrease the water-dispersibility and anticorrosive property of the resulting coating composition.

Formulation of Coating Composition

The coating composition of the present invention is prepared by dissolving or dispersing components (A), (B), (C) and (D) in a suitable amount of an aqueous medium. In order to render the mixture of these components easily water-soluble or water-dispersible, it is preferable to neutralize the mixture with 0.1 to 2.0, preferably 0.2 to 1.0 equivalents per equivalent of amino groups of component (A) of a water-soluble organic acid such as acetic acid, propionic acid, lactic acid and the like.

When dissolving or dispersing the mixture in water, a water-miscible organic solvent may be added to water or to the mixture of components for improving the stability or fluidity of the solution or dispersion of the mixture. This also improves the smoothness of the resulting coating film. Examples of such solvents include ethylcellosolve, propylcellosolve, butylcellosolve, ethylene glycol dimethyl ether, diethylene glycol dimethyl ether, diacetone alcohol, 4-methoxy-4-methylpentanone-2, methyl ethyl ketone and the like. The solvent may be used in an amount from 10 to 100 parts by weight per 100 parts by weight of total solid contents of the mixture of components (A)–(D).

The electrodeposition coating composition of this invention may further contain conventional pigments such as ferric oxide, lead oxide, basic lead silicate, strontium chromate, carbon black, titanium dioxide, talc, aluminum silicate, barium sulfate and the like. These pigments may be incorporated as such or in the form of a master batch prepared by mixing a large amount of pigment with a portion of solution or dispersion of neutralized component (A). Other conventional additives may also be incorporated as desired.

The invention is further illustrated by the following examples in which all parts and percents are by weight.

PRODUCTION EXAMPLE 1

NISSEKI polybutadiene B-2000 ($\overline{Mn}$=2,000, 1,2-vinyl= 65%) was epoxidized with peracetic acid to obtain an epoxidized polybutadiene ($E_1$) having an oxirane oxygen content of 6.4%.

1,000 g of epoxidized polybutadiene ($E_1$), 354 g of ethylcellosolve and 62.1 g of dimethylamine were reacted in a 2 liter autoclave at 150° C. for 5 hours. After unreacted dimethylamine was distilled off the residue was cooled to 120° C. A mixture of 79.3 g of acrylic acid, 7.6 g of hydroquinone and 26.4 g of ethylcellosolve was added to the residue and reacted therewith at 120° C. for 3¾ hours.

Component ($A_1$) having an amine number of 85.2 millimoles/100 g, an acid number of 10.0 millimoles/100 g, and a solid content of 75.0% was obtained.

PRODUCTION EXAMPLE 2

NISSEKI polybutadiene B-1800 ($\overline{Mn}$=1,800, 1,2-vinyl=64%) was epoxidized with peracetic acid to obtain an epoxidized polybutadiene ($E_2$) having an oxirane oxygen content of 6.5%.

1,000 g of epoxidized polybutadiene ($E_2$), 377 g of ethylcellosolve and 131.0 g of methyl ethanolamine were reacted in a 3 liter separable flask at 170° C. for 6 hours. After the reaction, the reaction mixture was cooled to 120° C. A mixture of 140.0 g of dehydrated castor oil fatty acid, 8.8 g of hydroquinone and 61.1 g of ethylcellosolve was added to the flask and reacted at 150° C. for 2 hours. The reaction mixture was cooled again to 120° C. 43.2 g of acrylic acid was added and reacted at 120° C. for 4 hours.

Component ($A_2$) having an amine number of 99.0 millimoles/100 g, an acid number of 9.9 millimoles/100 g, and a solid content of 75.0% was obtained.

PRODUCTION EXAMPLE 3

NISSEKI polybutadiene B-1800 was epoxidized with hydrogen peroxide in the presence of formic acid catalyst to obtain an epoxidized polybutadien ($E_3$) having an oxirane oxygen content of 6.7%.

1000 g of epoxidized polybutadiene ($E_3$), 357 g of ethylcellosolve and 74.6 g of dimethylamine were reacted in an 3 liter autoclave at 150° C. for 5 hours. After unreacted dimethylamine was distilled off, the reaction mixture was cooled to 120° C. A mixture of 140 g of synthetic drying oil fatty acid (HIDIENE, Soken Kagaku Co., Ltd.), 8.4 g of hydroquinone and 61.1 g of ethylcellosolve was added and reacted at 150° C. for 2 hours. After the reaction, the reaction mixture was cooled again to 120° C. 43.2 g of acrylic acid was added and reacted at 120° C. for 4 hours.

Component ($A_3$) having an amine number of 93.6 millimolles/100 g, an acid number of 9.8 millimoles/100 g, and a solid content of 75.0% was obtained.

PRODUCTION EXAMPLE 4

1,000 g of bisphenol A epoxy resin (EPIKOTE 1004, epoxy equivalent=950, Yuka Shell Epoxy Co., Ltd.) was dissolved in 343 g of ethylcellosolve. To the solution was added a mixture of 76.3 g of acrylic acid, 10 g of hydroquinone and 5 g of N,N-dimethylaminoethanol. The mixture was reacted at 100° C. for 5 hours to obtain a solution of component ($B_1$).

PRODUCTION EXAMPLE 5

1,000 g of bisphenol A epoxy resin (EPIKOTE 1001, epoxy equivalent=485, Yuka Shell Epoxy Co., Ltd.) was dissolved in 400 g of ethylcellosolve acetate. To the solution was added a mixture of 145.6 g of dehydrated castor oil fatty acid, 111.6 g of acrylic acid, 10 g of hydroquinone and 5 g of N,N-dimethylaminoethanol. The mixture was reacted at 100° C. for 5 hours to obtain a solution of component ($B_2$)

PRODUCTION EXAMPLE 6

1,000 g of toluenediisocyanate (mixture of about 80% of 2,4-isomer and about 20% of 2,6-isomer) was placed in a 5 liter separable flask. 2.036 g of ethylcellosolve was added dropwise over 2 hours with stirring. After the addition, the mixture was heated at 80° C. for 1 hour. A solution of blocked diisocyanate ($C_1$) was obtained. IR spectrometry revealed that the free isocyanato group absorption at about 2200 cm$^{-1}$ disappeared almost completely.

PRODUCTION EXAMPLE 7

500 g of 4,4'-diphenylmethanediisocyanate was dissolved in 500 g of methyl ethyl ketone in a 3 liter separable flask. To the solution was added 520 g of 2-ethylhexanol dropwise over 2 hours. The mixture was heated at 80° C. for 1 hour. A solution of blocked diisocyanate ($C_2$) was obtained. IR spectrometry revealed that the free isocyanato group absorption disappeared almost completely.

PRODUCTION EXAMPLE 8

1,000 g of NISSEKI polybutadiene B-700 ($\overline{Mn}$=700, 1,2-vinyl=52%), 117.3 g of maleic anhydride, 1 g of ANTIGEN 3C and 10 g of xylene were added to a 2 liter separable flask having a reflux condenser attached thereto. The mixture was heated at 195° C. for 5 hours under nitrogen gas current. Unreacted maleic anhydride and xylene were distilled off. A maleinized polybutadiene (M) having an acid number of 107 millimoles/100 g was obtained.

500 g of maleinized polybutadiene (M) was reacted with 148 g of ethylcellosolve at 120° C. for 2 hours. The product was cooled to room temperature and neutralized with 100 g of a 22.5% aqueous solution of sodium hydroxide. A quantity of deionized water was added to the neutralizate to make an aqueous solution of maleinized polybutadiene having a solid content of 25%.

To a solution of 74.5 g of manganese sulfate (MnSO$_4$.4½H$_2$O) in a mixture of 600 g of water, 600 g of isopropanol and 1,000 g of benzene was added 2192 g of the aqueous solution of maleinized polybutadiene dropwise at room temperature. After the addition, the mixture was heated at 60° C. for 30 minutes and then allowed to stand. The reaction mixture separated into two phases. The lower layer was discarded. The upper layer was heated in 1,000 g of deionized water at 60° C. for 30 minutes and allowed to stand for 1 hour. The lower layer was discarded again and the upper layer was distilled in vacuo to remove benzene and other volatile solvents. The residue was dissolved in ethylcellosolve to a solid content of 75% to give a solution of manganese salt of maleinized polybutadiene ($D_1$) having a manganese concentration of 2% as elementary manganese.

EXAMPLE 1

400 g of component ($A_1$) produced in Production Example 1, 240 g of component ($B_1$) produced in Production Example 4 and 48 g of component ($C_1$) produced in Production Example 6 were thoroughly mixed and neutralized with 8.1 g of acetic acid with stirring. The mixture was diluted with deionized water to give an aqueous solution having a solid content of 20%.

2,000 g of this solution, 4 g of carbon black, 20 g of basic lead silicate and 2,000 g of glass beads were placed in a 5 liter stainless steel beaker and vigorously mixed by a high speed rotary mixer for 2 hours. The mixture was filtered to remove glass beads and the filtrate was diluted to a solid content of 16.5% with deionized water containing 0.32 g of manganese acetate calculated as elementary manganese.

Electrodeposition coating was carried out using the resulting coating composition on a zinc phosphate-treated steel plate (Nippon Test Panel Co., Ltd., Bt 3004, 0.8×70×150 mm). The steel plate was used as cathode and a carbon electrode was used as anode. The results obtained are shown in Table 1.

EXAMPLE 2

The procedure of Example 1 was repeated except that the amount of component ($C_1$) was increased to 96 g. The results obtained are shown in Table 1.

COMPARATIVE EXAMPLE 1

The procedure of Example 1 was repeated except that component ($C_1$) was not incorporated at all. The results obtained are shown in Table 1.

COMPARATIVE EXAMPLE 2

The procedure of Example 1 was repeated except that the amount of component ($C_1$) was increased to 288 g. The results obtained are shown in Table 1.

EXAMPLE 3

400 g of component ($A_2$) produced in Production Example 2, 400 g of component ($B_2$) produced in Production Example 5 and 80 g of component ($C_2$) produced in Production Example 7 were thoroughly mixed and neutralized with 9.6 g of acetic acid with stirring. The mixture was diluted with deionized water to give an aqueous solution having a solid content of 25%.

1,000 g of this solution, 2.5 g of carbon black, 25 g of basic lead silicate and 1,000 g of glass beads were placed in a 3 liter stainless steel beaker and vigorously mixed by a high speed rotary mixer for 2 hours. The mixture was filtered to remove glass beads and the filtrate was diluted to a solid content of 18% with deionized water containing 0.13 g of manganese acetate calculated as elementary manganese.

Electrodeposition coating was carried out using the resulting coating composition on a zinc phosphate-treated steel plate (Nippon Test Panel Co., Ltd., Bt 3004, 0.8×70×150 mm). The steel plate was used as cathode and a carbon electrode was used as anode. The results obtained are shown in Table 1.

EXAMPLE 4

400 g of component ($A_3$) produced in Production Example 3, 400 g of component ($B_2$) produced in Production Example 5, 80 g of component ($C_2$) produced in Production Example 7 and 44 g of component ($D_1$) produced in Production Example 8 were thoroughly mixed and neutralized with 9.0 g of acetic acid with stirring. The mixture was diluted with deionized water to give an aqueous solution having a solid content of 30%.

1,000 g of this solution, 3 g of carbon black, 20 g of basic lead silicate and 1,000 g of glass beads were vigorously stirred in a 3 liter stainless steel beaker for 2 hours using a high speed rotary mixer. The mixture was filtered to remove glass beads and the filtrate was diluted to a solid content of 16% with deionized water containing 0.15 g of manganese acetate calculated as elementary manganese.

Electrodeposition coating was carried out using the resulting coating composition on a zinc phosphate-treated steel plate (Nippon Test Panel Co., Ltd., Bt 3004, 0.8×70×150 mm). The steel plate was used as cathode and a carbon electrode was used as anode. The results obtained are shown in Table 1.

COMPARATIVE EXAMPLE 3

The procedure of Example 3 was repeated except that component ($C_2$) was not incorporated at all. The results obtained are shown in Table 1.

COMPARATIVE EXAMPLE 4

The procedure of Example 4 was repeated except that component ($C_2$) was not incorporated at all. The results obtained are shown in Table 1.

TABLE 1

|  | Example 1 | Example 2 | Comparative Ex. 1 | Comparative Ex. 2 | Example 3 | Example 4 | Comparative Ex. 3 | Comparative Ex. 4 |
|---|---|---|---|---|---|---|---|---|
| Formulation |  |  |  |  |  |  |  |  |
| Component (A) | ($A_1$) | ($A_1$) | ($A_1$) | ($A_1$) | ($A_2$) | ($A_3$) | ($A_2$) | ($A_3$) |
| (g) | 400 | 400 | 400 | 400 | 400 | 400 | 400 | 400 |
| Component (B) | ($B_1$) | ($B_1$) | ($B_1$) | ($B_1$) | ($B_2$) | ($B_2$) | ($B_2$) | ($B_2$) |
| (g) | 240 | 240 | 240 | 240 | 400 | 400 | 400 | 400 |
| Component (C) | ($C_1$) | ($C_1$) | — | ($C_1$) | ($C_2$) | ($C_2$) | — | — |
| (g) | 48 | 96 |  | 288 | 80 | 80 |  |  |
| Component (D) | Mn(Ac)$_2$ | Mn(Ac)$_2$ | Mn(Ac)$_2$ | Mn(Ac)$_2$ | Mn(Ac)$_2$ | ($D_1$) | Mn(Ac)$_2$ | ($D_1$) |
| (g) | 1.0 | 1.0 | 1.0 | 1.0 | 1.25 | 44.0 | 1.25 | 44.0 |
| Baking temperature (°C.), for 20 minutes | 165 | 165 | 165 | 165 | 165 | 165 | 165 | 165 |
| Film thickness, (μ) | 20 | 20 | 20 | 20 | 20 | 20 | 20 | 20 |
| Weight loss upon baking, (%)[1] | 0.7 | 1.6 | 0.6 | — | 0.8 | 0.8 | 0.5 | 0.6 |
| Film testing[2] |  |  |  |  |  |  |  |  |
| Pencil hardness | 2H | H | 2H | 6B | H | 2H | 2H | 2H |
| Solvent resistance[3] |  |  |  | X |  |  |  |  |
| Corrosion resistance[4] for 500 hours |  |  |  | — |  |  |  | Δ |

TABLE 1-continued

| | Example 1 | Example 2 | Comparative Ex. 1 | Comparative Ex. 2 | Example 3 | Example 4 | Comparative Ex. 3 | Comparative Ex. 4 |
|---|---|---|---|---|---|---|---|---|
| 60° angle surface gloss | 70.3 | 65.0 | 35.5 | — | 68.2 | 75.5 | 46.5 | 51.0 |

Note

[1] Weight loss $= \dfrac{W_1 - W_2}{W_1} \times 100$ $W_1$ = Film weight before baking.
$W_2$ = Film weight after baking.
[2] According to JIS K-5400.
[3] Rubbing test with MIBK impregnated fabric at 50 reciprocations per minutes.
    No change
    Δ Dull surface
    X Exposure of substrate
[4] 5% saline spray test. Judged by the width of rust developed from the cut edge of applied coating film.
    less than 1 mm
    1–2 mm
    Δ 2–3 mm
    X greater than 3 mm
[5] Data measured by a digital glossmeter, Model UGV-4D, Suga Shikenki K.K.

We claim:

1. A cathode-depositing electrodeposition coating composition which comprises an aqueous solution or dispersion containing:

(A) 100 parts by weight of a reaction product produced by reacting (1) a polymer having a molecular weight from 500 to 5,000, a carbon-to-carbon double bond content corresponding to an iodine number from 50 to 500 and an oxirane oxygen content 3 to 12% by weight, with (2) 30 to 300 millimoles per 100 g of said reactant (1) of an amine of the formula:

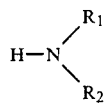

wherein $R_1$ and $R_2$ each represent a $C_1$–$C_{20}$ hydrocarbon radical or a corresponding radical substituted by a hydroxyl group, or $R_1$ and $R_2$ represent, taken together with the nitrogen atom, a saturated or unsaturated ring system, or by reacting the aforesaid reaction product of (1) and (2) with (3) 0 to 200 millimoles per 100 g of said reactant (1) of an α,β-unsaturated carboxylic acid of the formula;

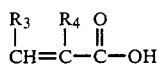

wherein $R_3$ and $R_4$ each represents a hydrogen atom or methyl group, an unsaturated aliphatic acid having a molecular weight from 100 to 350 and a conjugated carbon-to-carbon double bond content of at least 10% by weight, or a mixture thereof;

(B) 10 to 100 parts by weight of a reaction product of (1) a diglycidyl compound of the formula:

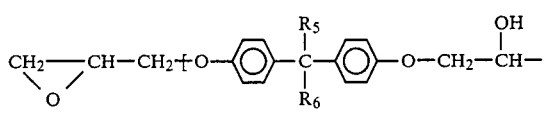
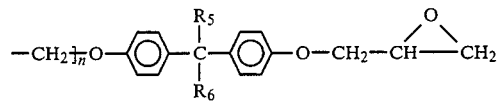

wherein $R_5$ and $R_6$ each represents a hydrogen atom or methyl group, and n is zero or an integer from 1 to 20; and (2) 1.9 to 2.1 moles per mole of said diyglycidyl compound (1) of an α,β-unsaturated carboxylic acid of the formula:

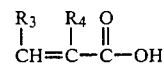

wherein $R_3$ and $R_4$ are as defined above, an unsaturated aliphatic acid having a molecular weight from 100 to 350 and a conjugated carbon-to-carbon double bond content of at least 10% by weight thereof, or a mixture thereof;

(C) 2 to 20 parts by weight of a blocked polyisocyanate compound capable of regenerating its isocyanate function upon heating; and (D) 0.05 to 1.0 part by weight calculated as elementary metal of manganese dioxide or an organic salt of manganese, cobalt or copper.

2. The coating composition of claim 1, wherein said reactant (1) of said component (A) is an epoxidized liquid polybutadiene.

3. The coating composition of claim 2, wherein said reactant (2) of said component (A) is dimethylamine or methyl ethanolamine.

4. The coating composition of claim 3, wherein said reactant (3) of said component (A) is acrylic acid, dehydrated castor oil fatty acid or a mixture thereof.

5. The coating composition of claim 4, wherein said reactant (1) of said component (B) is a bisphenol A epoxy resin.

6. The coating composition of claim 5, wherein said reactant (2) of said component (B) is acrylic acid, dehydrated castor oil fatty acid or a mixture thereof.

7. The coating composition of claim 6, wherein said component (C) is blocked tolylenediisocyanate or blocked 4,4'-diphenylmethanediisocyanate.

8. The coating composition of claim 7, wherein said component (D) is manganese acetate or manganese salt of maleinized polybutadiene.

9. The coating composition of claim 1, wherein the liquid medium of said aqueous solution or dispersion contains a water-miscible organic solvent.

10. The coating composition of claim 1, wherein said component (A) is neutralized with an organic acid.

11. The coating composition of claim 1, further comprising a pigment.

12. The coating composition of claim 1, wherein n is an integer from 1 to 10.

* * * * *